United States Patent [19]
Cornuejols

[11] Patent Number: 5,193,016
[45] Date of Patent: Mar. 9, 1993

[54] NON-LINEAR DEVICE FOR AMPLIFYING THE INTENSITIES OF LIGHT RAYS THAT PRODUCE AN IMAGE

[75] Inventor: Georges Cornuejols, Montferrier, France

[73] Assignee: Scanera S.G., France

[21] Appl. No.: 773,774

[22] Filed: Oct. 10, 1991

Related U.S. Application Data

[63] Continuation of Ser. No. 500,740, Mar. 28, 1990, abandoned.

[30] Foreign Application Priority Data

Mar. 28, 1989 [FR] France ................... 89 04333
Nov. 30, 1989 [FR] France ................... 89 16149

[51] Int. Cl.⁵ ............... G02F 1/33; G02F 1/335; G02F 1/35
[52] U.S. Cl. ................... 359/53; 359/63; 359/72
[58] Field of Search ........... 350/342 US, 342, 354, 350/331 R; 359/72, 63, 53

[56] References Cited

U.S. PATENT DOCUMENTS

| | | | |
|---|---|---|---|
| 3,722,998 | 3/1973 | Morse | 359/72 X |
| 3,758,207 | 9/1973 | Letzer | 359/72 X |
| 3,764,211 | 10/1973 | Morse et al. | 359/72 X |
| 4,060,316 | 11/1977 | Pollack et al. | 350/342 X |
| 4,110,014 | 8/1978 | Yevick | 350/342 |
| 4,762,397 | 8/1988 | Pepper | 359/72 X |
| 4,772,785 | 9/1988 | Cheng et al. | 350/354 X |
| 4,807,976 | 2/1989 | Little et al. | 350/342 X |
| 4,905,312 | 2/1990 | Mukozawa | 359/72 X |
| 4,908,584 | 3/1990 | Riechman | 350/342 X |
| 4,941,735 | 7/1990 | Moddel et al. | 350/342 |
| 5,002,369 | 3/1991 | Sakata | 350/354 |

Primary Examiner—William L. Sikes
Assistant Examiner—Ron Trice
Attorney, Agent, or Firm—Ostrolenk, Faber, Gerb & Soffen

[57] ABSTRACT

A non-linear device for amplifying the intensities of light rays includes a photosensitive optical component upon which a first image is formed by light rays incident upon the photosensitive optical component. A final image is formed from the rays passing through the photosensitive optical component. The photosensitive optical component includes a transparency which is variable at any point as a function of the luminous intensity reaching that point and another characteristic of the incident light. A control circuit responsive to the other characteristic is provided for controlling the operation of the optical component such that the luminous intensities of each point forming the initial image are amplified in a non-linear manner and form a final image, the contrast of the luminous intensities of which are different from those of the rays forming the initial image.

26 Claims, 7 Drawing Sheets

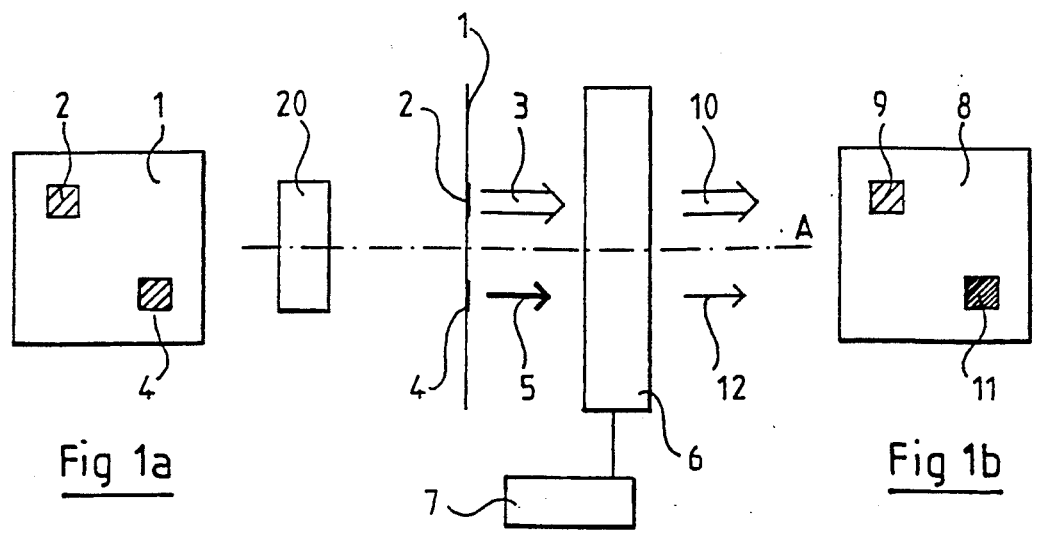
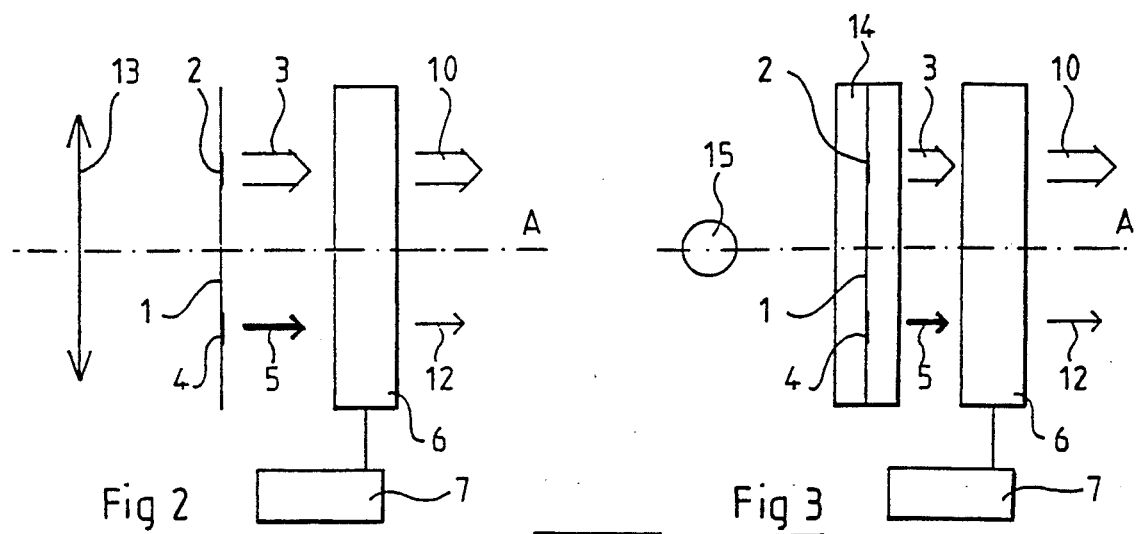
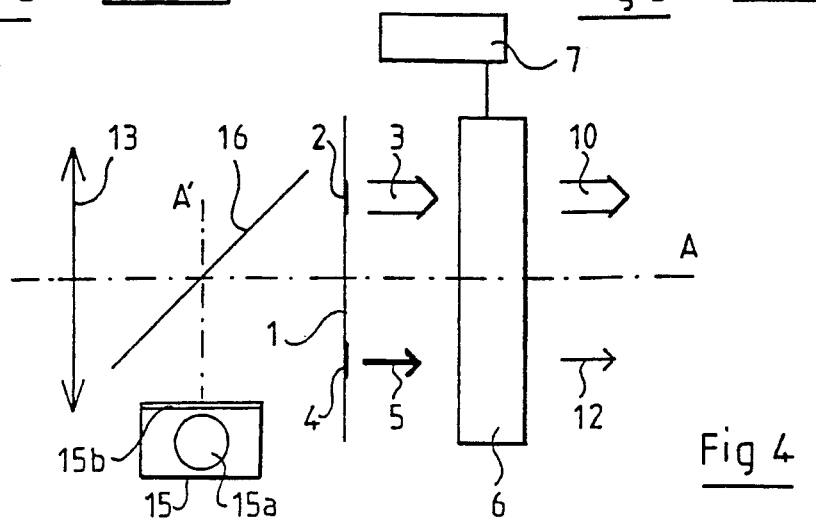

NON-LINEAR DEVICE FOR AMPLIFYING THE INTENSITIES OF LIGHT RAYS THAT PRODUCE AN IMAGE

This is a continuation of application Ser. No. 07/500,740 filed on Mar. 28, 1990, now abandoned.

BACKGROUND OF THE INVENTION

The present invention concerns an automatic device for transforming an initial image into a final image, the luminous intensities of which at any point are amplified in nonlinear manner. In particular, a device according to the present invention effects a modulation of radiations forming an image and makes it possible to control the intensification and contrasts of an image.

The optical devices known up to now have a linear response in luminous intensity. Image pick-ups, which have a limited tolerance to differences in luminous intensity, therefore cannot pick up images of natural scenes or contrasted images with such optical devices. Flat screen image protectors do not give sufficient contrast. Display screens are of low contrast or are very expensive to produce. Light intensifiers operate monochromatically, with very low image quality and a very weak signal/noise ratio.

SUMMARY OF THE INVENTION

The present invention proposes overcoming the foregoing drawbacks by providing a device comprising an optical component having a transparency at each point which is variable as a function of the luminous intensity reaching such point. A control circuit controls the operation of the optical component uniformly over its entire surface, the image being formed on or in the vicinity of this optical component and the rays forming this image passing through the optical component in such a manner that the luminous intensities of each point forming the initial image are amplified in nonlinear manner and form a final image, the contrasts of the luminous intensities of which are different from those of the rays forming the initial image.

The device in accordance with the invention may comprise different image-forming means, different means for the production of optical components, different optical arrangements and thus different circuits for the control of the operation of the optical component.

As used herein, the following terms shall have the following meanings:

(a) "photo-transparent component" means a component the transparency of which at each point is a function of the intensity of the light incident on this point;

(b) the "contrast between two points" means the ratio of the luminous intensities passing through said points; and (c) "initial image" means either a singular image or animated images.

The flat screens described in this description are primarily liquid crystal flat screens, for reasons of clarity. However, other components can be used, such as, for instance, PLZT ceramics, ferroelectric liquid crystals, magneto-optical screens and, more generally, all flat screen components.

The following description, given with reference to the accompanying drawing for purposes of illustration and not of limitation, will make it possible to better understand the advantages, purposes and characteristics of the present invention.

BRIEF DESCRIPTION OF THE DRAWINGS

In the accompanying drawings:

FIG. 1 is a diagrammatic sectional view through a device according to the invention;

FIG. 1a is a front view of an initial image before transformation by the device according to the invention;

FIG. 1b is a front view of the final image after transformation by the device of the invention;

FIG. 2 is a diagrammatic sectional view of the first embodiment of the device of the invention, comprising a lens.

FIG. 3 is a diagrammatic sectional view of a second embodiment of the device of the invention, comprising a flat screen.

FIG. 4 is a diagrammatic sectional view of a third embodiment of the invention, with lens and source of internal light.

Figure 5:
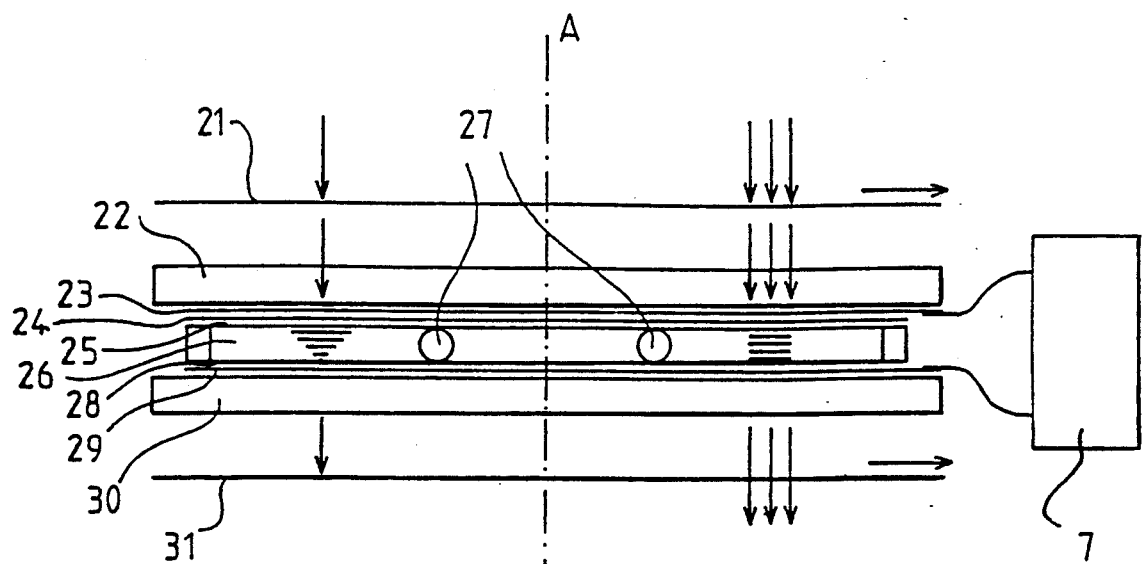
FIG. 5 shows a first embodiment of the photo-transparent component, of longitudinal photoconductive effect.

Other features and advantages of the present invention will become apparent from the following description of the invention which refers to the accompanying drawings.

DETAILED DESCRIPTION OF THE PREFERRED EMBODIMENTS

Referring, first of all, to FIGS. 1, 1a and 1b, there is seen in these figures, on an optical axis A, an optical or electro-optical system 20 forming an initial image 1 composed of a point of high luminous intensity 2 traversed by rays of high intensity 3 and a point of low luminous intensity 4 traversed by rays of low intensity 5; a photo-transparent component 6 the transparency of which at each point depends on the luminous intensity passing through it; a control circuit 7 receiving an average luminous intensity from the initial image and optically or electronically controlling the operation of the photo-transparent component 6, and this uniformly over the entire surface of the component 6; and final image 8 composed of a point of strong luminous intensity 9 traversed by rays of strong intensity 10 and a point of low luminous intensity 11 traversed by rays of low luminous intensity 12.

For reasons of clarity, the image 1 is shown in FIG. 1 at a distance from the photo-transparent component 6 but, in accordance with the invention, the image 1 may be in the vicinity of or on the surface of the photo-transparent component 6. Similarly, in all cases for purposes of explanation, for each image, whether initial image 1 or final image 8, only two points are shown, and the thickness of the light rays shown corresponds to their luminous intensity.

The points 2 and 9 are located at the same places in the initial image and final image, as are the points 4 and 11, the shapes represented by the initial and final images being identical.

The system 20 is formed either of a lens, which then forms an image 1 from a scene placed in its optical field, which lens is shown in FIGS. 2 and 4, or of a flat screen displaying an image, such as shown in FIG. 3.

Depending on whether the rays forming the initial image converge optically in front of or behind the surface of the photo-transparent component 6, the initial image is a real or virtual image, respectively. The final image is, therefore, a virtual or real image, respectively.

The photo-transparent component 6 is afocal. The directions of propagation of the rays 3 and 10 are identical, as well as the directions of the rays 5 and 12. On the other hand, the ratios of the luminous intensities of the rays 10 and 12 emerging from the component 6 to the luminous intensities of the rays 3 and 5 entering the component 6 are different. The final image, therefore, has a contrast which differs from the initial image.

The transparency at each point of the photo-transparent component 6 depends directly, on the one hand, on the control which is transmitted uniformly over its surface, optically or electronically, by the control circuit 7 and, on the other hand, on luminous intensity passing through each point of the photo-transparent component.

In particular, the photo-transparent component 6 can be formed of a transmissive passive flat screen with polarizers, in which screen there is inserted, between the control electrodes, at least one photoconductive layer or assembly of doped electronic layers, the contract of which functions in the same manner as a photodiode so that the electromagnetic field at each point of the flat screen depends on the incident luminous intensity of the rays forming the initial image.

The photo-transparent component 6 can also be formed of a flat screen with polarizers operating in accordance with an electromagnetic field, the transverse or longitudinal orientation and intensity of which depend on the intensity of the rays forming the initial image, said rays arriving on at least one photoconductive layer or on a photodiode effect contact arranged between parallel electrodes.

In all cases, the effect which varies the transparency of the photo-transparent component 6 at any point is photoinduced, that is to say controlled by the incident light and not electronically.

These different embodiments are shown in FIGS. 5 to 10.

The position of polarizers forming part of the photo-transparent component 6 then determines the increase or decrease of the transparency curve of the component 6 as a function of the luminous intensity, which curve is identical at each point of this flat screen. The positions of these polarizers are described further below.

Finally, the photo-transparent component 6 may be composed of a layer of photo-electro-optical or photo-chemical-optical material, with or without feed source.

Figure 11:
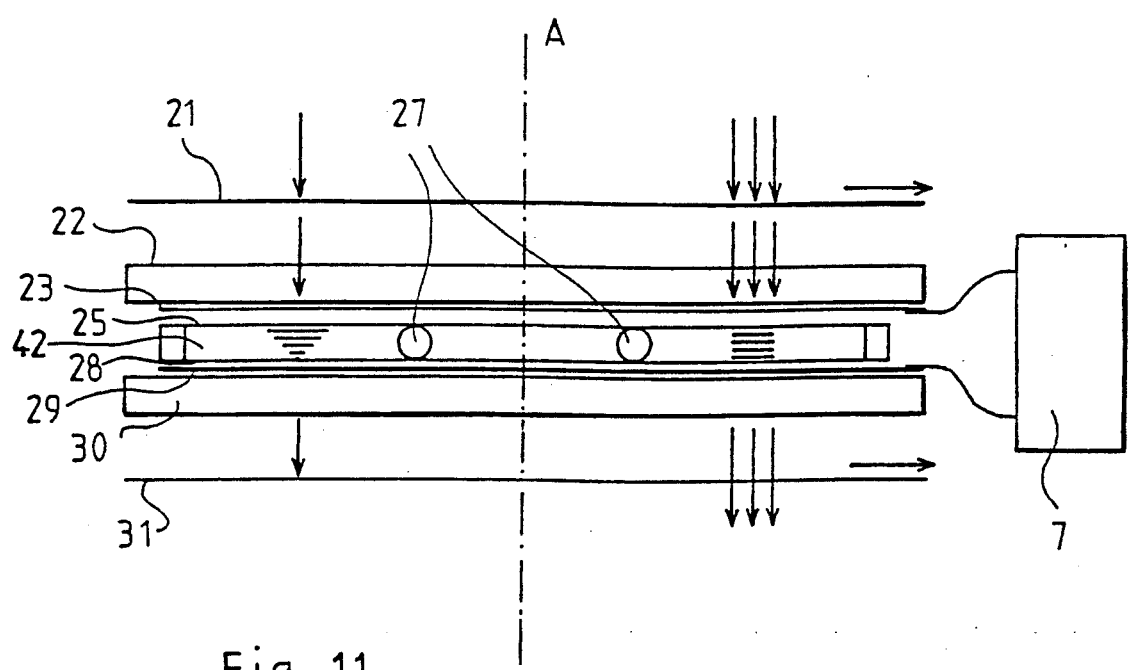
FIG. 11 shows a seventh embodiment of the photo-transparent component, of photo-electro-optical or photo-chemical-optical effect.

These last embodiments are shown in FIG. 11.

In order to effect a measurement of an average of the luminous intensities of the points constituting the initial image 1, the circuit 7 may comprise a photosensitive cell, for example a photo-electric cell which perceives the initial image 1.

The circuit 7 can also receive a signal emitted by an electronic image pick-up and extract a characteristic value from it.

The electronic circuit 7 can use the response of the component 6 to its control signals in order to measure an average transparency of this component 6, said transparency, as explained above, being a function of the luminous intensities at any point of the initial image 1.

Finally, the electronic circuit 7 can—but only in the event that the initial image 1 is formed of a flat screen as, for instance, in the embodiment of the device in accordance with the invention shown in FIG. 3—be connected to this flat screen, collect its control signals, and extract a characteristic value therefrom.

These different circuits are easy to produce and are not all described here.

In order to control the sensitivity and operation of the photo-transparent component 6, several principles can be employed.

On the one hand, the photoconductive or the photo-diode effect depends frequently on the temperature of the photosensitive layers. The circuit 7 can therefore be connected to a transparent heating electrode, for instance of ITO or tin and indium oxide, inserted in the component 6. It is to be noted that the electrodes shown in FIGS. 5 to 11 can also be used for this purpose in the manner that each image is connected to two electronic terminals of the circuit 7 and that a uniform control voltage is maintained over the entire surface of the component 6.

On the other hand, the emission by an electro-optical or optico-electronic component, such as an electroluminous diode, of a radiation which reaches the entire surface of the component 6 makes it possible to activate the operation of this component.

The control signals of the component 6, which signals are generally square alternating signals, can be controlled in accordance with their three parameters, voltage, intensity and frequency, by the electronic circuit 7.

Finally, the circuit 7 can control a diaphragm placed in a lens which forms the initial image 1 or the transparency of an optical filter, for instance with liquid crystals in such a manner that the average intensity of the image 1 falls within the range of luminous intensities in which the component 6 operates.

The production of these different modes of controlling the operation of the photo-transparent component 6 does not present any difficulty and is therefore described only briefly in FIG. 12.

The control circuit 7 receives an average or extreme characteristic luminous intensity of the initial image, either by a measurement cell receiving rays forming the initial image 1; or by an electronic signal coming from an electronic image pick-up, in the event that the device is combined with an electronic camera; or by a measurement of an electric, resistance or current parameter through the component 6; or by an electronic control signal of a screen forming an image, in the event that the initial image is formed on a screen.

It is to be noted that the average luminous intensity received by the control circuit 7 is a weighted average.

The control circuit 7 controls, uniformly over the entire surface of the photo-transparent component 6, one of the parameters of the photo-transparency, that is, the voltage, the total intensity, the frequency, or the feed current of the component 6, the temperature of the component 6, or a radiation in addition to the rays forming the initial image 1, the said additional radiation reaching this component 6. Finally, the control circuit 7 can control a value of the average luminous intensity of the initial image by the control of the system 20 forming the initial image 1.

It is to be noted that, for reasons of effectiveness, several photo-transparent components 6 can be used in the device of the invention.

In FIG. 2 the same elements can again be noted as in FIG. 1, the optical or electro-optical system 20 being, in this case, a lens 13.

The final image can be picked up by an electronic image pick-up such as those used in video cameras or in a chemical image pick-up such as the chemical films used in cameras. In this application the lens 13 forms the image 1 optically behind the photo-transparent component 6, and the image pick-up is positioned in the focal plane of the lens 13, at which place the final image 8 is formed.

The final image can also be picked up by the human eye, by the use of an additional optical system type known in particular in camera viewers.

The applications of the device in accordance with its first embodiment are primarily the reduction of image contrasts, in particular for images taken out of doors or with sources of light in the optical field of the lens 13.

In FIG. 3 the same elements can be noted as in FIG. 1, the system 20 being, in this case, a flat screen 14 forming an image 1 from an electronic signal, and a source of light 15. The control circuit 7 is then connected either to the component 6, of which it measures one of the electric characteristics, intensity passing through it or total resistance, or to the electronic signal controlling the display of the image 1 on this flat screen 14.

This embodiment of the device forming the object of the present invention is particularly suitable for image projectors and display screens. It then accentuates the luminous contrast of the image formed on the flat screen 14.

FIG. 4 contains the same elements as in FIG. 1, the optical or electro-optical system 20 being, in this case, a lens 13, a source of light 15, and a means 16 for combining the rays forming the initial image and the luminous rays coming from said luminous source 15. The said combining means 16 is, in this case, a partially reflecting blade 16, and the source of light is formed of an incandescent bulb 15a and of a ground glass 15b. Other sources of light and other known optical means are in accord with the spirit of the invention.

In accordance with this third embodiment, the control signal for the operation of the photo-transparent component 6 and the control signal for the operation of the luminous source 15 are temporarily alternated with respect to each other. In this way, the photoinduced photo-transparency effect depends only on the light rays coming from the lens 13, the component 6 being at rest during the light-emission phases of the source 15.

The light rays coming from the luminous source 15 and passing through the photo-transparent component 6 are modulated by the transparencies at each point of this component 6, and the final image is alternatively that described with respect to FIGS. 1 to 2 and that produced in this way.

This third embodiment permits amplification of the luminous intensities of the rays forming the initial image 1 coming from the lens 13.

It permits the eye and less sensitive image pick-ups to perceive image of low luminosity.

The embodiments of the device shown in FIGS. 2 and 4 can be attached to an image pick-up on the rear face of the component 6. The lens 13 then focuses the image 1 on this image pick-up through the photo-transparent component 6. Cameras of high sensitivity and/or resistant to glare are thus produced.

In FIG. 5 there are shown the elements of a liquid crystal screen of the shutter type, that is to say having two electrodes and an active zone, and a uniform photo-conductive layer arranged between one of these electrodes and the liquid crystal. This assembly constitutes a first embodiment of the photo-transparent component 6.

FIG. 5 shows, on an optical axis A, a polarizer 21, a glass substrate 22, a uniform electrode 23, a photoconductive layer 24, an orientation layer 25, a liquid crystal 26, spacers 27, an orientation 28, a uniform electrode 29, a glass substrate 30 and a polarizer 31.

Off the optical axis A, a control circuit 7 is connected to the electrodes 23 and 29.

The light rays are represented by arrows parallel to the axis A and the polarization axes of the polarizers 21, 31 are represented by arrows perpendicular to said optical axis. A.

The photoconductive layer 24 is of very small thickness, of the order of a micron, and its electric conduction at each point is variable and decreases as a function of the luminous intensity incident on this point.

The difference in potential around a point of the liquid crystal 26 is therefore variable as a function of the luminous intensity passing through it and reaching the corresponding point of the photoconductive layer 24. As this difference in potential influences the effect of the liquid crystal, the transparency of the component 6 depends point by point on the luminous intensity incident on this point.

However, the positions of the polarizers 21 and 31 define whether the transparency of the component 6 is an increasing or decreasing function of the incident luminous intensity.

In the case shown in FIG. 5, the liquid crystal, in the absence of potential difference between the electrodes 23 and 29, causes the polarization of the light to turn, it passing through a quarter of a revolution. It is, for instance, of the type known as "Twisted Nematic" or "TN". In the presence of sufficient potential difference between the surfaces of the liquid crystal, the latter loses its optical activity and no longer turns the axis of polarization of the light which passes through it.

As the polarizers 21 and 23 have parallel axes of polarization in FIG. 5, the point transparency is, in this case, an increasing function of the incident light intensity.

In a variant, the polarizers are crossed, that is to say their polarization axes are perpendicular and the point transparency is a decreasing function of the incident light intensity.

In other variants, the angle of rotation due to the effect of the liquid crystal is other than 90° and the positions of the polarizers can determine alternately increasing and decreasing functions. In particular, for the embodiment shown in FIG. 4, an increasing and then decreasing function is adapted to intensity the points of the image 1 the intensity of which is too low to be picked up by a conventional pick-up, then decreasing to reduce the strong luminous intensities.

The circuit 7 can, in this case, perceive an average luminous of the image 1 by measuring the total electric conduction of the component 6 between the electrodes 23 and 29. A simple automatic control circuit then makes it possible to display a voltage between these electrodes, depending automatically on this total electrical resistance.

Figure 13:
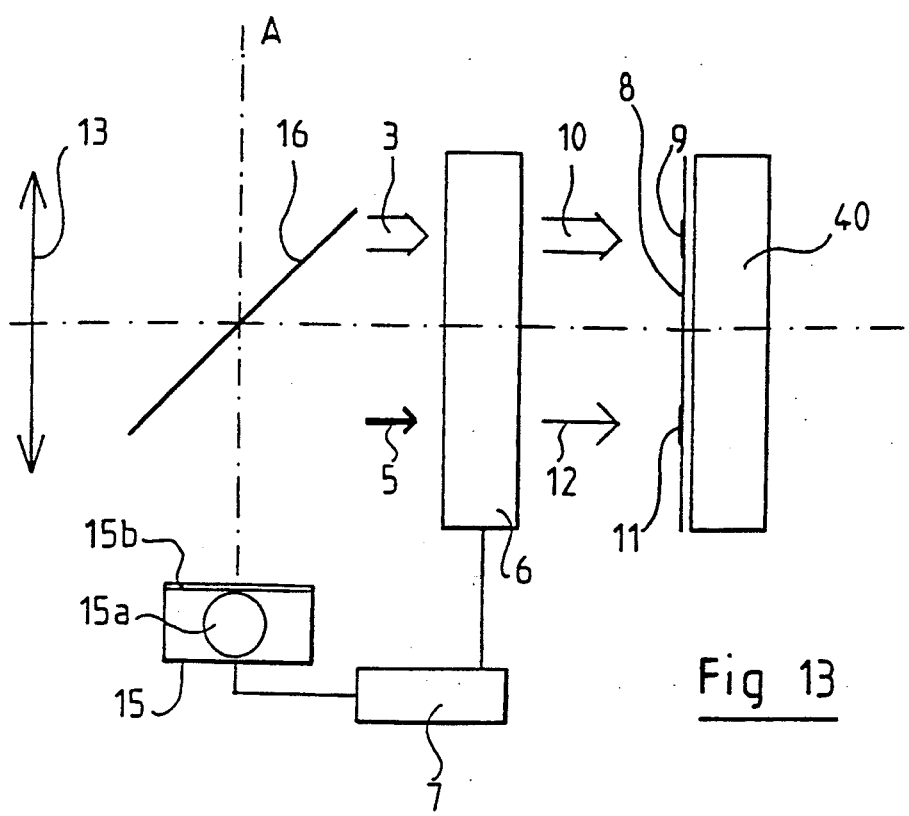
FIG. 13 shows the third embodiment of the device of the invention which has been shown in FIG. 4, combined with an image pick-up.

However, other methods of measuring the average light intensity of the image 1 are shown in FIG. 13, and can be directly connected to the embodiment of component 6 shown in FIG. 5.

This first embodiment of the photo-transparent component 6 has the main advantage of being easily produced.

In FIG. 6 there are again present the elements shown in FIG. 5, with the exception of the photoconductive layer 24. The latter is in this case replaced by two photodiodes developed in parallel layers 32, 33, 34 and 35. The layers 32 and 35 are doped, for instance, with positive electric charges, and the layers 33 and 34 are doped in electrically opposite manner.

The junctions between the layers 33 and 34 on the one hand and 35 and 36 on the other hand produce photodiodes which allow the electric current to pass through point-wise in increasing manner as a function of the incident luminous intensity.

The liquid crystal is therefore, in this case, controlled in intensity without variation of the potential difference between the electrodes 23 and 29.

It is to be noted that a single photodiode may be sufficient in order to form a photo-transparent component 6 in accordance with the spirit of the invention.

For greater ease in production, the doped layers 32, 33, 34 and 35 can be broken up in their surface, as well as the electrodes 23 and 29.

Figure 6:
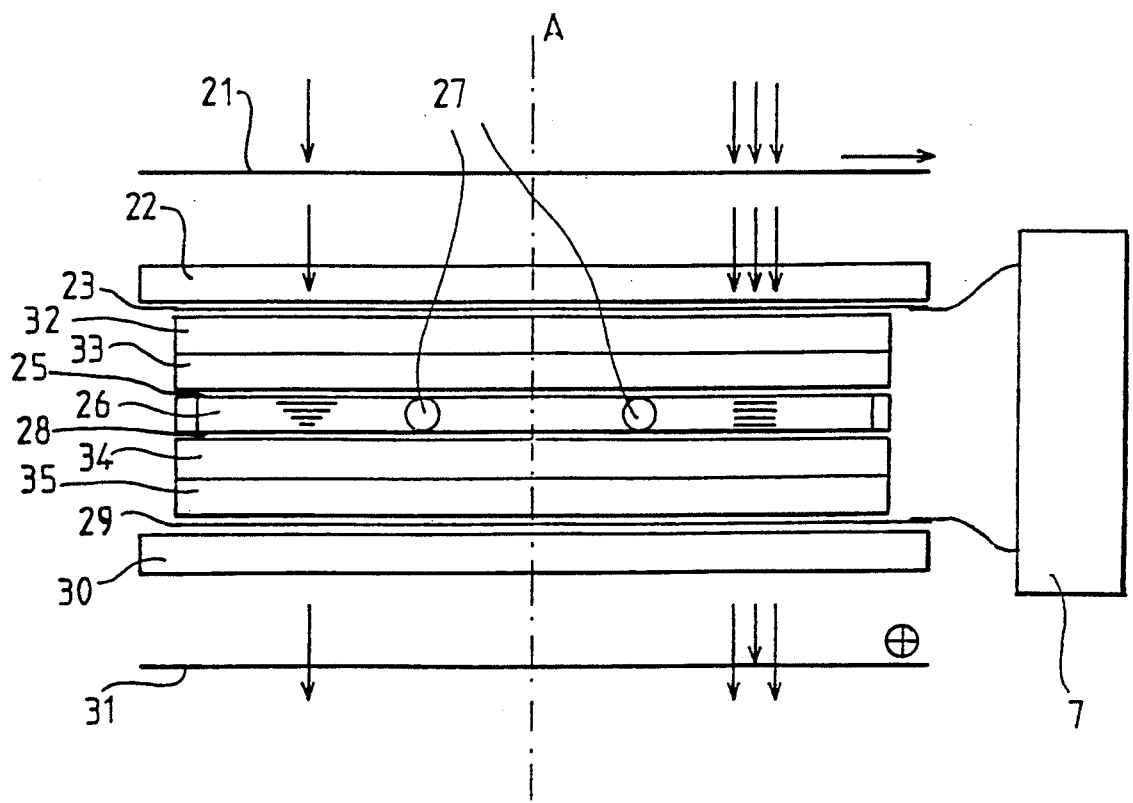
FIG. 6 shows a second embodiment of the photo-transparent component, of longitudinal photodiode effect.

In FIG. 6 the polarizers are represented with crossed polarization axes. If the liquid crystal is of the 90° "twisted nematic" type, the transparency of each point of the component 6 is a decreasing function of the luminous intensity incident on this point.

One of the advantages of this embodiment is its rapidity of response.

Figure 7:
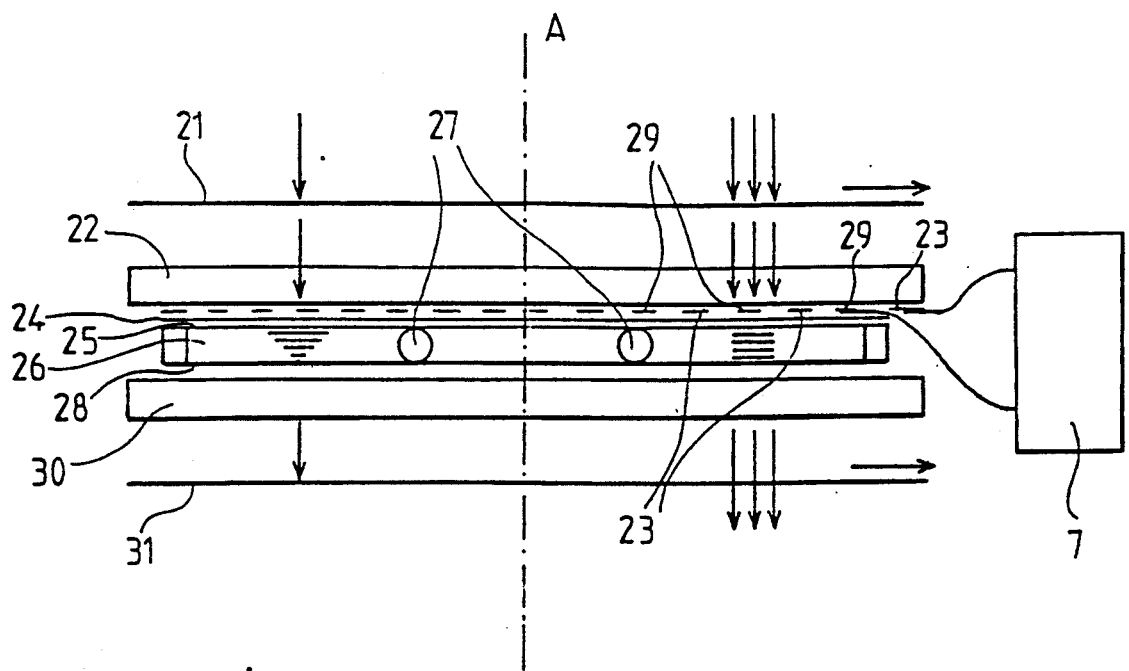
FIG. 7 shows a third embodiment of the photo-transparent component, of traverse photoconductive effect.

In FIG. 7 the elements shown in FIG. 5 are present again, but the electrodes 23 and 29 are arranged alternately and parallel to each other on the same side of the liquid crystal 26. The electrodes of the component 6 are therefore alternately connected to the terminals of the circuit 7. The distance between the electrodes is preferably greater than the thickness of the liquid crystal 26. The electrodes 23 and 29 are connected to the terminals of the control circuit 7.

In accordance with this embodiment of the component 6, the conductivity of the photoconductive layer between two points of two parallel electrodes influence the intensity of the lateral electric field of the zone of the liquid crystal located between these two points. This electric field determines the optical effect of the liquid crystal in the same manner as previously.

As a variant, the electrodes 23 and the photoconductive layer 24 are located on opposite sides of the liquid crystal 26

This embodiment has applications for images the average luminous intensity of which is high.

Figure 8:
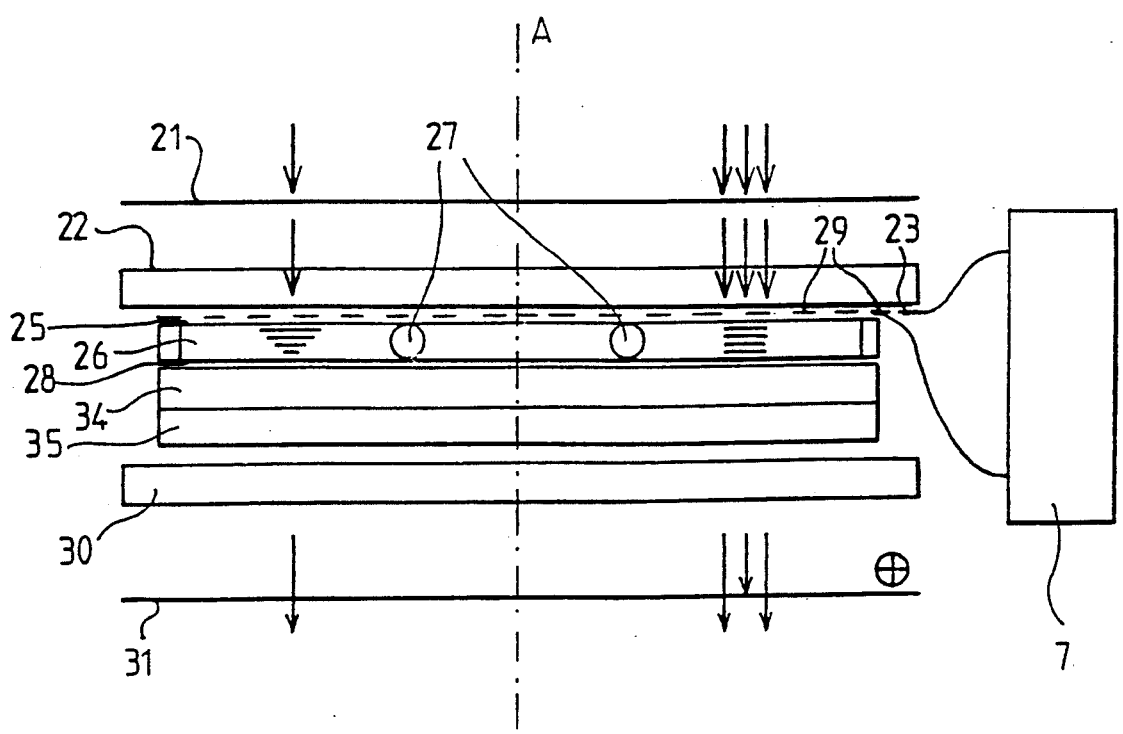
FIG. 8 shows a fourth embodiment of the photo-transparent component, of transverse photodiode effect.

FIG. 8 shows the same elements as FIG. 7 but the photoconductive layer 244 is replaced by two doped layers 33 and 34 facing the electrodes 23 and 29. The operation of this embodiment is the same as that shown in connection with FIG. 6, the electric fields being transverse and/or longitudinal here.

Figure 9:
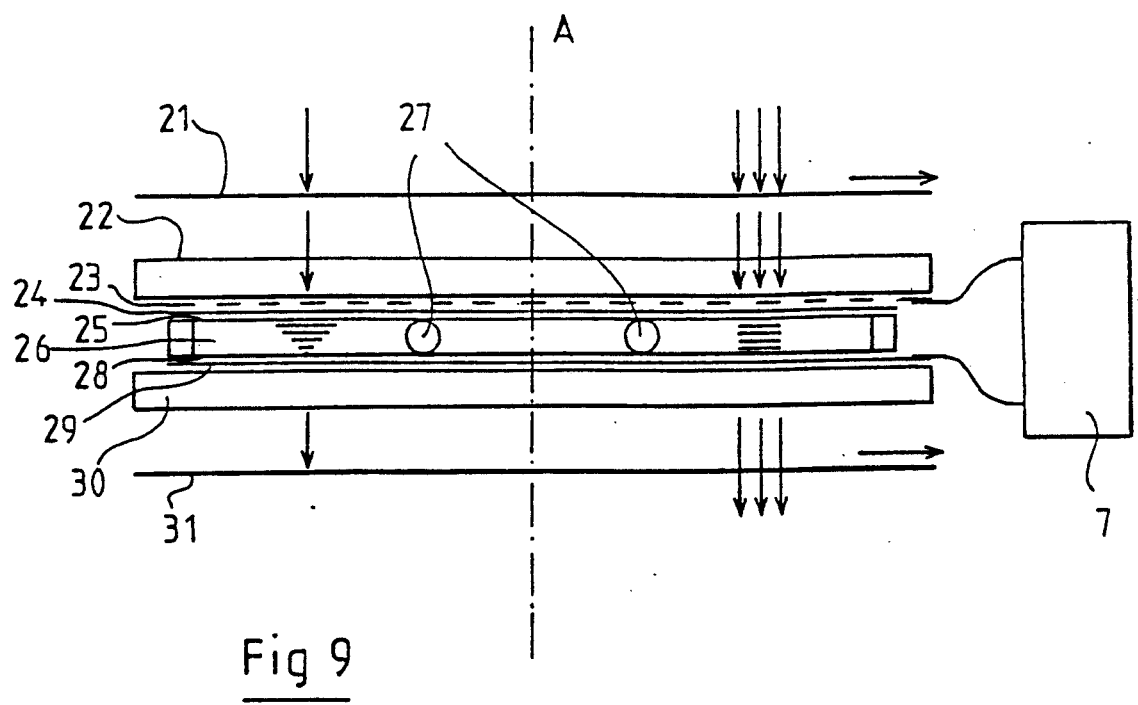
FIG. 9 shows a fifth embodiment of the photo-transparent component, of matrix photoconductive effect.

In FIG. 9 the same elements are present as in FIG. 5 but the electrodes 23 and 29 form parallel electrode networks, said networks being crossed. The operation is identical to that shown in FIG. 5 but the voltages applied to the liquid crystal zones placed between two electrodes 23 and 29 may be different. In particular, the control signals of these zones can correspond to the display of a positive or negative image of the image 1 so as to amplify the effectiveness of operation of the device of the invention.

Figure 10:
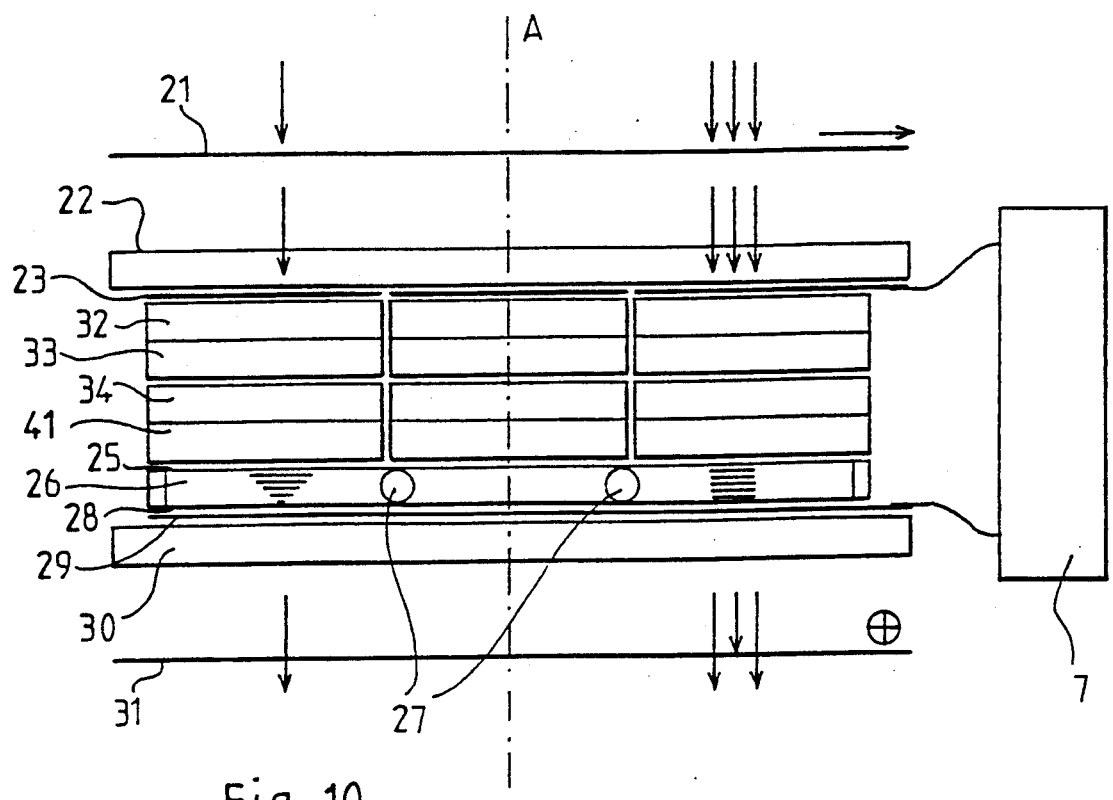
FIG. 10 shows a sixth embodiment of the photo-transparent component, of matrix photodiode effect.

In FIG. 10 the same elements are present as in FIG. 9 but the photoconductive circuit is replaced by a network of photo-transistors developed as three doped layers 32, 33, 34 and between the electrodes 23 and 29 there are rectangular electrode zones 41 which serve to create capacitances with the surfaces of the electrodes 29 and are charged by the photo-transistors.

Other photo-transistors or diode embodiments operating in matrix manner may also be developed by transforming the transistors or diodes of the active-matrix liquid-crystal screens into photo-transistors or photodiodes.

FIG. 11 shows the same elements as FIG. 5 with the exception of the photoconductive layer 24 and the liquid crystal 26.

The liquid crystal is replaced here by a uniform layer 42 which has a photo-electro-optical effect, that is to ay its optical characteristics of transparency at any point depend directly on the intensity of the incident light in point form by two successive effects, one photo-electric and the other electro-optical. Such a layer can be formed by a chemical mixture or combination of a liquid crystal and a semiconductor.

In accordance with a variant, chemical compounds which naturally have an effect of nonlinearity of transmission of the light can serve as fundamental component of the photo-transparent component 6.

In a variant, the photo-transparent component 6 is formed of a chemical compound placed between two plates of glass and utilizing the principle of chemical waves in order to produce increasing or decreasing transparencies as a function of the incident luminous intensities. The first chemical compounds known having these effects are an acid solution of a bromate in the presence of a catalyst, a ruthenium complex, this solution being present in a thin layer on the order of a millimeter. Placed between colored filters, its transparency is variable.

For the different embodiments of the component 6 shown in FIGS. 5 to 11, it may be useful to combine several photo-transparent components 6 in the device of the invention.

These components can then have a different sensitivities.

For the components 6 having a liquid crystal, it will be preferred to associate liquid crystals the rotational effects of which on the polarized light take place in accordance with opposite directions of rotation.

Likewise, operation in color of the device can be obtained by adding colored filters in triad in the component 6, or by utilizing three components 6' placed one after the other on the optical axis A and each operating in accordance with a fundamental color.

For the combination of several photo-transparent components 6 with polarizers, such as those shown in FIGS. 5 to 11, certain positions of polarizers permit special functionings.

Thus, the use of a liquid crystal having a rotational power of half a revolution, namely 180°, by the positioning of two polarizers having perpendicular polarization axes, makes it possible to produce a point-by-point transparency of the component 6 which is an increasing and then decreasing function of the incident light intensity. For the embodiment shown in FIG. 4, this function makes it possible to amplify the low luminous intensities and decrease the contrasts of the points of high luminous intensity.

The combining of two components 6, each having a rotational power of 90°, namely one-quarter of a revolution, but having different sensitivities, that is, reacting to different light intensity values at each point, can be effected without intermediate polarizer and with polarizers having perpendicular axes of polarization. This combination produces the same function as that presented in the preceding paragraph but with a much greater effectiveness.

Two photo-transparent components 6 having complementary rotational powers, that is, the total of which forms 90°, and the sensitivities of which are different, with or without intermediate polarizer, makes it possible to realize functions of low slope.

A "twisted nematic" liquid crystal having a rotational power of 90° placed optically behind a polarizer makes it possible electrically to control the axis of polarization of the light emerging therefrom.

The insertion of such a liquid crystal TN between one of the polarizers 21 or 31 and the liquid crystal 26 of the photo-transparent components present in FIGS. 5 to 11 makes it possible to reverse the derivative of the transparency/luminous intensity function at each point.

This permits the device to operate by accentuating or reducing the contrasts, depending on the control of the circuit 7 or the control by the user effected via a push button or a potentiometer, for example.

Four control circuits 7 are shown in FIGS. 12a, 12b, 12c and 12d.

Figure 12A:
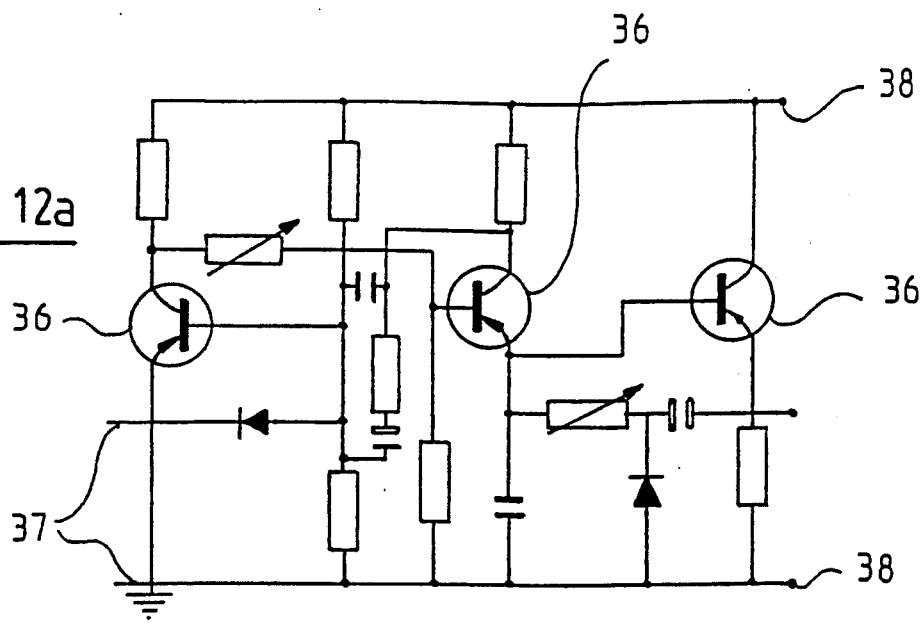
FIGS. 12a, 12b, 12c and 12d show four electronic circuits for the control of the device of the invention.
Figure 12B:
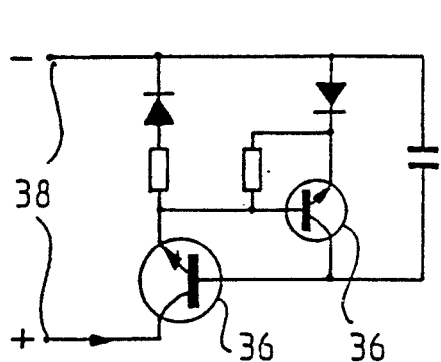

The circuit shown in FIG. 12a has three transistors 36, an input connector 37 and an output connector 38. The input connector 37 can be connected to the image starting signal of an electronic camera or to a photographic camera trigger, for instance. The output connector 38 is connected to the electrodes of the photo-transparent component 6.

This circuit 7 produces functions which increase in "ramps" after each synchronization signal. It therefore makes it possible to control a variable and progressive sensitivity of the component 6.

The points of this component therefore react in succession as a function of the incident light intensity as soon as said intensity exceeds the instantaneous sensitivity of the component 6.

This circuit is particularly adapted to components 6 which have only two states, one transparent and the other opaque. The components 6 of PLZT ceramic or with ferro-electric liquid crystals are examples for which the circuit shown in FIG. 12a is of interest.

The transparency of each point of the component 6 is produced for a variable period of time as a function of the incident luminous intensity.

In FIG. 12b, there is again noted the output connector 38 and an electronic circuit having two transistors 36. This circuit, of known type, which is connected in parallel to the component 6 is an electric intensity regulator.

The electric intensity passing through the component 6 is therefore fixed at a predetermined value which controls an average transparency of the component 6.

Figure 12C:
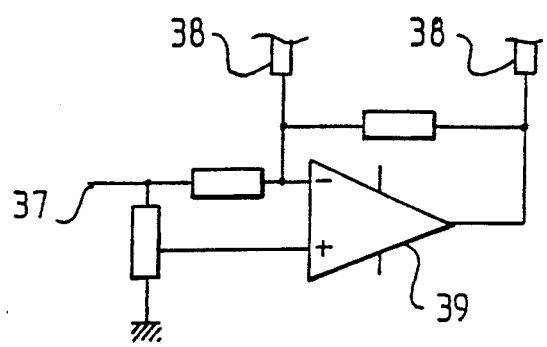

FIG. 12c shows an amplifier circuit the amplification of which depends on the resistance between the electrodes of the component 6. This circuit is therefore more particularly adapted to embodiments of the component 6 having a photoconductive material.

This circuit 7, therefore, has an input connector 37 and an output connector 38, as well as an operational amplifier 39 in accordance with a very conventional electronic circuit.

The control voltage of the component 6 is therefore in this case a function of the resistance of this component, this resistance being itself a function of an average luminous intensity of the initial image 1.

Figure 12D:
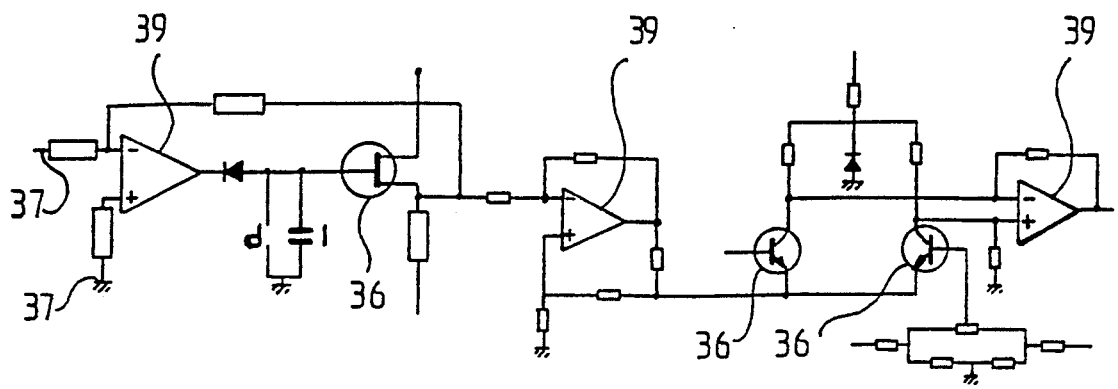

Finally, FIG. 12d shows an electronic circuit 7 adapted to the embodiments of the device of the invention having an image pick-up. The input connector 37 is connected to the signal emitted by the said image pick-up. The output connector 38 is connected to the electrodes of the components 6. The voltage between these electrodes is then a function of the signal emitted by the image pick-up. In the circuit 7 shown in FIG. 12d there can be noted two stages comprising operational amplifiers 39, the first being a stage for the detection of the maximum value of the signal emitted by the image pick-up and the second effecting the multiplication of the signal coming from the first stage by a constant signal. As the peak value of a video signal corresponds generally to the maximum luminous intensity received by this pick-up, the circuit shown here effects a counteracting of glare.

The circuits shown here are given merely by way of illustration in order to show the diverse nature of the control means which can be employed.

Likewise, the connections of the output connector 38 to the component 6 can be replaced by connections to the other control means mentioned above, comprising a luminous source, a diaphragm, and a heating electrode or generating alternating control signals of the component 6, for example.

FIG. 13 shows a third embodiment of the device of the invention as shown in FIG. 4, combined with an electronic camera.

FIG. 13 shows, on an optical axis A; a lens 13 forming a virtual initial image (not shown) formed of a point of high luminous intensity traversed by rays of high intensity 3 and a point of low luminous intensity traversed by rays of low intensity 5; a photo-transparent component 6, the transparency of which at each point depends on the luminous intensity passing through it; a control circuit 7 receiving an average luminous intensity from the initial image and electronically controlling the operation of the photo-transparent component 6, doing so uniformly over the entire surface of the component 6; a real final image 8 formed of a point of strong luminous intensity 9 traversed by rays of strong intensity 10 and a point of low luminous intensity 11 traversed by rays of low luminous intensity 12; a luminous source 15; a means 16 for combining the rays coming from the lens 13 and those coming from the luminous source 15; and an electronic image pick-up 40.

The control circuit 7 is electronically connected, on the one hand, to the photo-transparent component 6 and, on the other hand, to the luminous source 15. It controls, in succession, the operation of the photo-transparent component 6 and the source of light 15 during the duration of the recording of an image by the pick-up 40. Between two recordings of images, the photo-transparent component 6 and the luminous source 5 are at rest.

The photo-transparent component 6 here has transparency at each point which is an increasing and then decreasing function of the incident luminous intensity. In order to present such a function, the component has a rotational power of 180° and two polarizers having perpendicular axes of polarization. Its photoelectric effect has a very low response time, less than the time between two image recordings by the pick-up 40. The source of light 15 emits light for a period of time less than the response time of the liquid crystal 26.

The rays of low luminous intensity correspond therefore to increasing transparencies of the photo-transparent component 7.

During the emission of the luminous source 15, the intensities of the rays transmitted to the pick-up 40 which are the products of the transparencies of the component 6 at any point by the intensity of the rays coming from the luminous source 15 and reaching the component 6 are increasing as a function of the luminous intensities of the initial image.

The rays of low luminous intensity are then amplified in such a manner that they can be perceived by the image pick-up 40.

On the other hand, the rays of strong luminous intensity, which may be picked up by the pick-up 40, correspond to the decreasing part of the transparency/intensity curve. Their contrasts are therefore reduced, and the device of the invention can thus pick up an image of very high contrast.

The rays emitted by the luminous source 15 do not affect the operation of the component 6 since the latter is at rest during the emission of these rays. Even in the case of the use of the photoconductive effect, the response time of this photoconductor being less than the time between two image recordings by the pick-up 40, the conduction induced by the rays coming from the source 15 has disappeared at the start of the following image recording.

One particularly interesting application of the device of the invention is the development of sighting telescopes. In particular, it will be readily understood that the embodiments shown in FIGS. 4 and 13 are adapted to night vision, the pick-up shown in FIG. 13 being then suppressed and a complementary optical system making it possible to see the final image 8 before it is added.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

I claim:

1. A device for producing a final image by non-linear amplification of the intensities of light rays that produce an initial image, which comprises:
   a flat photosensitive optical component, the initial light rays passing through the flat photosensitive optical component and becoming final light rays;
   the flat photosensitive optical component having a transparency that varies point by point in accordance with the intensity of the initial light rays striking that point and with another characteristic of the initial light rays forming the initial image, such that the intensities of the final light rays are the products of the intensities of the corresponding initial light rays and the transparencies of each point on the flat photosensitive optical component where the initial light rays strike the flat photosensitive optical component the ratios of the intensities of the final rays differing from the ratios of the intensities of the corresponding initial light rays, the flat photosensitive optical component comprising a uniform photo-conductive layer and a liquid crystal layer the transparency of which is variable point by point as a function of the voltage which is applied to the liquid crystal layer and the liquid crystal layer having a rotary power of 180 degrees and positioned between two crossed polarizers in such a manner that the transparency is an increasing and then decreasing function of the incident luminous intensity; and
   means responsive to the other characteristic of the initial light rays together with the intensity of the light striking a point on the flat photosensitive optical component controlling the transparency of the flat photosensitive optical component at such point.

2. A device for producing a final image by non-linear amplification of the intensities of initial light rays which comprises:
   a flat photosensitive optical component;
   means including a flat screen associated with a luminous source and an electrical signal for forming an initial image and for directing initial light rays from said initial image onto the flat photosensitive optical component, the initial light rays passing through the flat photosensitive optical component and becoming final light rays;
   the flat photosensitive optical component having a transparency that varies point by point in accordance with the intensity of the initial light rays striking that point and with another characteristic of the initial light rays, each point of the flat photosensitive optical component having a transparency varying as an increasing function of the luminous intensity striking that point, such that the intensities of the final light rays are the products of the intensities of the corresponding initial light rays and of the transparencies of each point on the flat photosensitive optical component where the initial rays strike the flat photosensitive optical component, the ratios of the intensities of the final light rays being different than the ratios of the intensities of the corresponding initial light rays; and
   means responsive to the other characteristic of the initial light rays, together with the intensity of the light striking a point of the flat photosensitive optical component, controlling the transparency of the flat photosensitive optical component at such point.

3. A device for non-linearly amplifying the intensity of light rays, which comprises:
   a flat photosensitive optical component;
   an objective lens for directing initial light rays of an image of a scene onto the flat photosensitive optical component, the flat photosensitive optical component being positioned near the focal plane of the objective lens and the initial light rays passing through the flat photosensitive optical component and becoming final light rays having the same direction as the corresponding initial light rays;

a sensor for sensing the average intensity of the initial light rays and for generating a first electrical signal representative of said average intensity;

an electrical circuit connected to the flat photosensitive optical component and responsive to the first electrical signal from the sensor for applying a second electrical signal to said flat photosensitive optical component which is a function of the average intensity of the initial light rays;

the flat photosensitive optical component having a transparency that varies point by point in accordance with the intensities of the initial light rays striking that point and with said second electrical signal, such that the intensities of the final light rays are the products of the intensities of the corresponding initial light rays and the transparencies of each point on the flat photosensitive optical component where the initial light rays strike the flat photosensitive optical component, the ratios of the intensities of the final light rays differing from those of the intensities of the corresponding initial light rays.

4. A device for non-linearly amplifying the intensity of light rays, which comprises:

a flat photosensitive optical component;

an objective lens for directing initial light rays of an image of a scene onto the flat photosensitive optical component, the flat photosensitive optical component being positioned near the focal plane of the objective lens and the initial light rays passing through the flat photosensitive optical component and becoming final light rays having the same direction as the corresponding initial light rays;

the flat photosensitive optical component having a transparency that varies point by point in accordance with the intensities of the initial light rays striking that point, such that the intensities of the final light rays are the products of the intensities of the corresponding initial light rays and the transparencies of each point on the flat photosensitive optical component where the initial light rays strike the flat photosensitive optical component, the ratios of the intensities of the final light rays differing from those of the intensities of the corresponding initial light rays, the transparency of each point of the flat photosensitive optical component being an increasing and then decreasing function of the intensities of initial light rays striking said point.

5. A device according to claim 3 or claim 4, further comprising a luminous source for uniformly illuminating the flat photosensitive optical component on the same side as the initial light rays and with final light rays having a wavelength in the same range as the initial light rays.

6. A device according to claim 5 wherein the operation of the flat photosensitive optical component and that of the luminous source are temporarily alternated so that transparencies of the flat photosensitive optical component depend only on the intensities of the initial light rays.

7. A device for non-linearly amplifying the intensity of light rays, which comprises:

a flat photosensitive optical component;

means including a flat screen associated with a luminous source and an electrical signal for forming an image and for directing initial light rays from said image onto the flat photosensitive optical component, the initial light rays passing through the flat photosensitive optical component and becoming final light rays;

the flat photosensitive optical component having a transparency that varies point by point as an increasing function of the intensities of the initial light rays striking that point, such that the intensities of the final light rays are the products of the intensities of the corresponding initial light rays and the transparencies of each point on the flat photosensitive optical component where the initial light rays strike the flat photosensitive optical component, the ratios of the intensities of the final light rays differing from those of the intensities of the corresponding initial light rays.

8. A device according to claim 4 which further includes an electronic circuit connected to the flat photosensitive optical component.

9. A device according to claim 4 which further includes an electronic circuit connected to the flat photosensitive optical component including a sensor responsive to an average intensity of the initial light rays, said electronic circuit controlling an average transparency of the flat photosensitive optical component by applying electrical signals to said flat photosensitive optical component.

10. A device according to claim 6 which further includes an electronic circuit connected to the flat photosensitive optical component.

11. A device according to claim 3, 4 or 7, wherein the flat photosensitive optical component has a uniform photoconductive layer and a layer of an electro-optical material, the optical response of the electro-optical material being variable point by point as a function of the voltage which is applied to the electro-optical material or the intensity of the electric current which passes through the electro-optical material.

12. A device according to claim 3 or 8, wherein the flat photosensitive optical component has a plurality of electrodes which are arranged parallel to each other on the same side of the electro-optical material and the electronic circuit has two terminals which are respectively connected to different alternate ones of the plurality of electrodes of the flat photosensitive optical component.

13. A device according to claim 21 or claim 9, wherein the flat photosensitive optical component has a uniform photoconductive layer and a layer of an electro-optical material, the optical response of the electro-optical material being variable point by point as a function of the voltage which is applied to the electro-optical material or the intensity of the electric current which passes through the electro-optical material and wherein the flat photosensitive optical component has electrodes which are arranged on both sides of the electro-optical material forming two crossed networks, the sensor of the electronic circuit having at least as many photosensitive areas as the product of the number of electrodes of each side of the electro-optical material.

14. A device according to claims 3, 4 or claim 7 wherein the flat photosensitive optical component has a layer of an electro-optical material, the optical response of the electro-optical material being variable point by point as a function of the voltage which is applied to the electro-optical material or the intensity of the electric current which passes through the electro-optical material.

15. A device according to claim 3 or claim 8 wherein the flat photosensitive optical component has a layer of an electro-optical material, the optical response of the electro-optical material being variable point by point as a function of the voltage which is applied to the electro-optical material or the intensity of the electric current which passes through the electro-optical material and wherein the flat photosensitive optical component has a plurality of electrodes which are arranged parallel to each other on the same side of the electro-optical material an the electronic circuit having two terminals which are respectively connected to different alternate ones of the plurality of electrodes of the flat photosensitive optical component.

16. A device according to claim 3 or claim 9, wherein the flat photosensitive optical component has at least two electrically doped uniform layers producing at their junction a photodiode and a layer of an electro-optical material, the optical response of the electro-optical material being variable point by point as a function of the voltage which is applied to the electro-optical material or the intensity of the electric current which passes through the electro-optical material and wherein the flat photosensitive optical component has electrodes which are arranged on both sides of the electro-optical material forming two crossed networks, the sensor of the electronic circuit having at least as many photosensitive areas as the product of the numbers of electrodes of each side of the electro-optical material.

17. A device according to claim 12 wherein the electro-optical material is a liquid crystal.

18. A device according to claim 3 or claim 4 wherein the flat photosensitive optical component contains a photo-electro-optical material or photo-chemico-material.

19. A device according to claim 3 or claim 9 wherein the sensor is an image pick-up.

20. A device according to claim 19 wherein the means for directing the initial light rays is a lens and wherein the image pick-up is positioned in the focal plane of said lens.

21. A device according to claim 3 or claim 9 wherein the flat photosensitive optical component has an electrical characteristic varying with the intensities of the initial light rays, the sensor being the flat photosensitive optical component.

22. A device according to claim 11 wherein the flat photosensitive optical component has an electrical characteristic varying with the intensities of the initial light rays, the sensor being the flat photosensitive optical component.

23. A device according to claim 3 or claim 9 wherein the flat photosensitive optical component has a plurality of zones connected to an electronic circuit which further includes a sensor having at least as many photosensitive areas as the number of zones of the flat photosensitive optical component and controlling each of these zones as a function of an average intensity of initial light rays reaching each zone, this average intensity being sensed by the sensor.

24. A device according to claim 3 or claim 4, which further comprises an image pick-up attached to the flat photosensitive optical component and the image pick-up is positioned in the focal plane of the lens.

25. A device for non-linearly amplifying the intensity of light rays, which comprises:

a flat photosensitive optical component;
an objective lens for directing initial light rays of an image of a scene onto the flat photosensitive optical component the flat photosensitive optical component being positioned near the focal plane of the objective lens and the initial light rays passing through the flat photosensitive optical component and becoming final light rays having the same direction as the corresponding initial light rays;
an electronic circuit connected to the flat photosensitive optical component including a sensor responsive to an average intensity of the initial light rays, said electronic circuit controlling an average transparency of the flat photosensitive optical component by applying electrical signals to said flat photosensitive optical component;
the flat photosensitive optical component having a transparency that varies point by point in accordance with the intensities of the initial light rays striking that point and with said electrical signals, such that the intensities of the final light rays are the products of the intensities of the corresponding initial light rays and the transparencies of each point on the flat photosensitive optical component where the initial light rays strike the flat photosensitive optical component, each point of the flat photosensitive optical component having a transparency varying as a decreasing function of the luminous intensity of the initial light rays reaching said point, the ratios of the intensities of the final light rays being less than those of the initial light rays.

26. A device of non-linearly amplifying the intensity of light rays, which comprises:

a flat photosensitive optical component;
an objective lens for directing initial light rays for an image of a scene onto the flat photosensitive optical component, the flat photo-sensitive optical component being positioned near the focal plane of the objective lens and the initial light rays passing through the flat photosensitive optical component and becoming final light rays having the same direction as the corresponding initial light rays;
an electronic circuit connected to the flat photosensitive optical component including a sensor responsive to an average intensity of the initial light rays, said electronic circuit controlling an average transparency of the flat photosensitive optical component by applying electrical signals to said flat photosensitive optical component;
the flat photosensitive optical component having a transparency that varies point by point in accordance with the intensities of the initial light rays striking that point and with said electrical signals, the flat photosensitive electro-optical component including a liquid crystal, said liquid crystal having a rotary power of 180 degrees and being positioned between two crossed polarizers in such a manner that the transparency is an increasing an then decreasing function of the intensities of the initial light rays, the intensities of the final light rays being the products of the intensities of the corresponding initial light ray and the transparencies of each point on the flat photosensitive optical component where the initial light rays strike the flat photosensitive optical component, the ratios of the intensities of the final light rays differing from those of the intensities of the corresponding initial-light rays.

* * * * *